J. C. MACFARLANE & H. BURGE.
ELECTRICAL REGENERATIVE CONTROL APPARATUS AND SYSTEM.
APPLICATION FILED FEB. 7, 1910.
980,979. Patented Jan. 10, 1911.
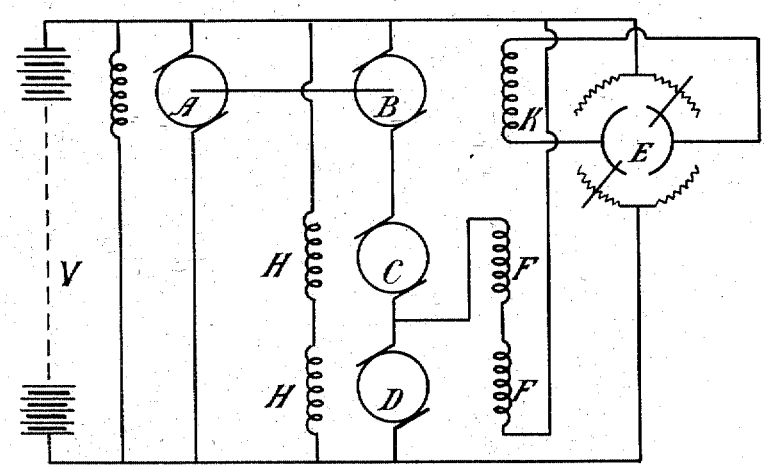
Witnesses:
Inventors
James C. Macfarlane
Harry Burge
By James L. Norris
Atty.

UNITED STATES PATENT OFFICE.

JAMES COLQUHOUN MACFARLANE AND HARRY BURGE, OF ARC WORKS, CHELMSFORD, ENGLAND, ASSIGNORS TO THE FIRM OF CROMPTON AND COMPANY LIMITED, OF ARC WORKS, CHELMSFORD, ENGLAND.

ELECTRICAL REGENERATIVE CONTROL APPARATUS AND SYSTEM.

980,979.  Specification of Letters Patent.  Patented Jan. 10, 1911.

Application filed February 7, 1910.  Serial No. 542,481.

*To all whom it may concern:*

Be it known that we, JAMES COLQUHOUN MACFARLANE and HARRY BURGE, subjects of the King of Great Britain, residing at Arc Works, Chelmsford, in the county of Essex, England, have invented certain new and useful Improvements in Electrical Regenerative Control Apparatus and Systems, of which the following is a specification.

This invention relates to improvements in electrical regenerative control apparatus and systems, such for example as are applied to trains, tramway cars, omnibuses, fly wheel storage systems, and the like, and the invention has for object to provide means for automatically strengthening the fields of the motors during the period of negative acceleration so that the regenerative or electrical braking tendency is largely increased, and the invention also has for object to provide means whereby the field strength of the motors may be automatically diminished during the periods of acceleration so that the acceleration is augmented.

According to the invention the apparatus consists of a motor-generator and of one or more motors, all coupled together on the well-known "Ward-Leonard" system.

The accompanying drawing shows diagrammatically the application of the invention to a Ward Leonard system arranged with the dynamo of the motor generator and the two working motors all placed in series across the line.

In the drawing, A and B are two elements of a motor-generator and C and D are a pair of motors coupled in series with each other and with the generator element B of the motor-generator.

E is a reversible shunt regulator controlling the fields K of the generator element B of the motor generator in such manner that any voltage from zero to approximately twice the supply voltage V can be impressed on the motors C and D.

Assuming that the voltage of supply V is say 100 volts, then when the dynamo B is without excitation there will be 100 volts across the motors C and D. When the dynamo is fully excited in the positive sense there will be 200 volts across the motors and when fully excited in the negative sense there will be no volts on the motors. The motors C and D are so designed that with the excitation due to the constant excitation windings H, they will run at normal speed when supplied with current at twice the normal voltage, in this case 200 volts.

If the motors C and D are provided with constant excitation windings H, it is obvious that when the motors are running at a certain speed, if the field winding K of the generator element B is altered in strength in such a way that the motors C and D lose speed, said motors will tend to regenerate, that is to say they will tend to return current to the line. If the strength of the field winding K of the generator element B is altered in the opposite sense to the above, the speed of the revolving parts of the motors C and D will be accelerated. This regenerative or electrical braking tendency and also the acceleration are capable of being considerably augmented if during such periods the field strength of the motors C and D is at the same time increased or diminished, as the case may be.

In order to provide means for automatically strengthening the fields of the motors C and D during the period of negative acceleration and for automatically diminishing the field strength of said motors during periods of positive acceleration, both the motors C and D are provided with auxiliary shunt or regulating windings F, arranged so as to assist the ordinary shunt windings H and coupled as shown diagrammatically in the drawing. The said auxiliary windings are coupled in series and joined in shunt across the dynamo B and one motor C.

It will be observed that when the impressed voltage on the motors is double the line voltage and the motors are running at full speed the potential difference across the ends of the auxiliary shunt or regulating windings F is approximately zero, and therefore the magneto-motive-forces exerted by these windings F are approximately zero.

When the impressed voltage on the motors is zero and the motors are at rest the potential difference across the ends of the windings F is a maximum and therefore the magneto-motive-forces exerted by the windings F are a maximum. In other words, the magneto-motive-forces exerted by the windings F increase directly as the speed diminishes, thus giving the speed and torque characteristic of series motors without the employment of series field windings on the motors.

What we claim is.

1. An electrical regenerative control system comprising a motor generator having a motor element and a generator element, a pair of motors connected in series with each other and with the generator element of said motor generator, a reversible shunt regulator for controlling the field of said generator element, in such manner that any voltage from zero to approximately twice the supply voltage can be impressed upon said pair of motors, constant excitation windings upon said pair of motors, and means for automatically strengthening the fields of said pair of motors during the period of negative acceleration and for automatically diminishing the field strength of said motors during periods of positive acceleration.

2. An electrical regenerative control system comprising a motor generator having a motor element and a generator element, a pair of motors connected in series with each other and with the generator element of said motor generator, a reversible shunt regulator for controlling the field of said generator element, constant excitation windings upon said pair of motors, and auxiliary shunt windings connecting said pair of motors and one supply main.

In testimony whereof we have hereunto set our hands in presence of two subscribing witnesses.

JAS. COLQUHOUN MACFARLANE.
HARRY BURGE.

Witnesses:
ERNEST JOHN HILL,
HARRY J. STOGDEN.